3,632,571
FLUORO ALCOHOL/POLYISOCYANATE ADDUCTS CONTAINING AZIRIDINYL GROUPS
Dilip Kumar Ray-Chaudhuri, Somerset, N.J., assignor to National Starch and Chemical Corporation, New York, N.Y.
Filed Aug. 9, 1967, Ser. No. 659,410
Int. Cl. C07d 23/08; C09d 5/00
U.S. Cl. 260—239 E                   1 Claim

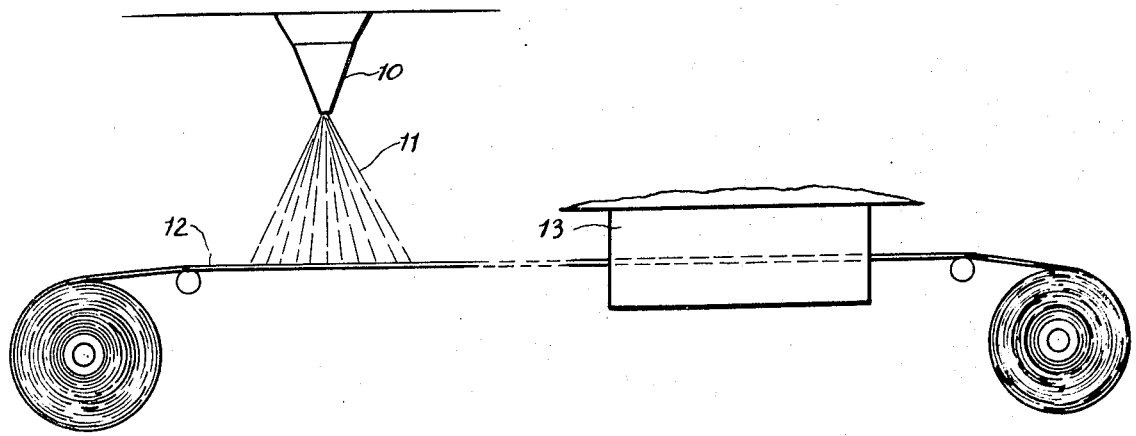

ABSTRACT OF THE DISCLOSURE

Fluoro-aziridine compounds comprising the products resulting from the reaction of an alkylenimine with an intermediate isocyanate adduct comprising the reaction product of a fluoro alcohol and a polyisocyanate reagent. The resulting fluoro-aziridine compounds impart both water and oil repellency to a wide variety of substrates.

SUMMARY OF THE INVENTION

It is the object of this invention to prepare novel fluoro-aziridine compounds which, when utilized to treat substrates exhibiting either fibrous, porous or continuous surfaces, will provide such substrates with a high degree of water, oil and soil repellency. Various other objects and advantages of this invention will become apparent to the practitioner from the following description thereof.

Thus the products of this invention comprise the novel fluoro-aziridine compounds corresponding to the formula:

$$Z-(X)_m-CH_2O-\overset{O}{\underset{\|}{C}}-NH-Y-NH-\overset{O}{\underset{\|}{C}}-N\overset{CH_2}{\underset{CH-W}{\diagup}}$$

Z is a radical selected from the group consisting of straight chained and branched perfluoro alkyl radicals corresponding to the formula $C_sF_{(2s+1)}$ wherein $s$ is an integer having a value of from 3 to 7 inclusive;

X is a radical selected from the group consisting of alkylene radicals corresponding to the formula $(CH_2)_p$ wherein $p$ is an integer having a value of from 1 to 10 inclusive, 5-yl-norbornene-2-yl-methyl

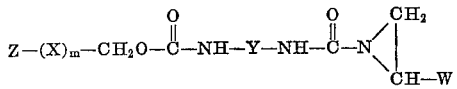

radicals wherein R is a radical selected from the group consisting of hydrogen radicals and alkyl radicals containing

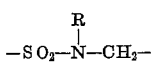

radicals wherein R' is a radical selected from the group consisting of hydrogen radicals and alkyl radicals containing from 1 to 6 carbon atoms, m is an integer having a value of from 0 to 1 inclusive;
Y is a radical selected from the group consisting of alkylene radicals corresponding to the formula $(CH_2)_e$ wherein $e$ is an integer having a value of from 4 to 36 inclusive, tolylene, i.e.

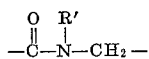

radicals, naphthylene, i.e.

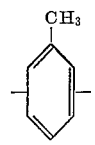

radicals, methylene-bis-(phenyl), i.e.

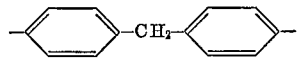

radicals, propylene-bis-(phenyl), i.e.

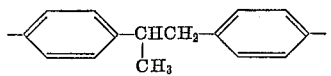

radicals, phenylene, i.e.

radicals, diphenylene, i.e.

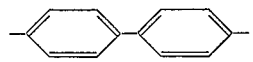

radicals, xylene, i.e.

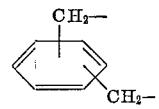

radicals, cyclopentylene, i.e.

radicals and cycloheylene, i.e.

radicals and, alkylidene radicals, and cycloalkylidene radicals; and,
W is a radical selected from the group consisting of hydrogen radicals and alkyl radicals containing from 1 to 2 carbon atoms.

As previously noted, materials which have been treated with the novel fluoro compounds of this invention exhibit excellent water, oil and soil repellency. Among the primary advantages derived from the use of these additives are included: (1) the ability to use a single additive in order to acquire a large number of desired properties; (2) the applicability of these additives to a wide variety of substrates; (3) the prolonged retention of the properties imparted by these novel additives despite repeated wet laundering and/or dry cleaning; (4) the ease with which substrates may be treated with these additives; and, (5) the enhanced strength and hand which is also imparted to the thus treated fabrics, etc.

DESCRIPTION OF THE PREFERRED EMBODIMENT

In brief, the procedure for preparing the novel fluoro-aziridine compounds of this invention comprises reacting: (1) a fluoro alcohol with (2) a polyisocyanate and, thereafter, reacting the resulting intermediate isocyanate adduct with an alkylenimine.

The fluoro alcohols applicable for use in the process of this invention correspond to the following formula:

$$Z-(X)_m-CH_2OH$$

wherein:

Z is a radical selected from the group consisting of straight chained and branched perfluoro alkyl radicals corresponding to the formula $C_sF_{(2s+1)}$ wherein $s$ is an integer having a value of from 3 to 7 inclusive;

X is a radical selected from the group consisting of alkylene radicals corresponding to the formula $(CH_2)_p$ wherein $p$ is an integer having a value of from 1 to 10 inclusive, 5-yl-norbornene-2-yl-methyl radicals, $$-SO_2-\underset{R}{\underset{|}{N}}-CH_2-$$

radicals wherein R is a radical selected from the group consisting of hydrogen radicals and alkyl radicals containing from 1 to 6 carbon atoms, $$-\underset{\underset{O}{\|}}{C}-\underset{\underset{R'}{|}}{N}-CH_2-$$

radicals wherein R′ is a radical selected from the group consisting of hydrogen radicals and alkyl radicals containing from 1 to 6 carbon atoms, $m$ is an integer having a value of from 0 to 1 inclusive.

Thus, among the applicable fluoro alcohols are included: dihydro perfluorooctanol, i.e. $C_7F_{15}CH_2OH$; omega-perfluoroheptyl undecanol, i.e. $C_7F_{15}(CH_2)_{10}OH$; 2-hydroxymethyl, 5-perfluoroheptyl norbornene; (N-methyl-perfluoroheptanesulfonamido)-ethanol, i.e.

$$C_7F_{15}-SO_2-\underset{\underset{CH_3}{|}}{N}-CH_2-CH_2OH$$

2-(perfluoroheptanesulfonamido)-ethanol, i.e.

$$C_7F_{15}-SO_2NH-CH_2CH_2OH$$

2-(perfluoroheptanecarboxamido)-ethanol, i.e.

$$C_7F_{15}-\underset{\underset{O}{\|}}{C}-NH-CH_2-CH_2OH$$

and, 2 - (N - methyl - perfluoroheptanecarboxamido)-ethanol, i.e.

$$C_7F_{15}-\underset{\underset{O}{\|}}{C}-\underset{\underset{CH_3}{|}}{N}-CH_2-CH_2OH$$

In addition, the fluoro alcohols resulting from the reaction of a wide variety of fluoro carboxylic acids, e.g. perfluoro octanoic acid and omegaperfluoro heptyl undecanoic acid, with either alkylene oxides such as ethylene oxide and propylene oxide; diols, including polyester and polyether diols, such as ethanediol-1,2 and propanediol-1,3; triol such as trimethylol ethane and trimethylol propane; tetrols such as erythritol and pentaerythritol; or, hexols such as sorbitol, are also applicable for use in the novel process of this invention though not reflected in the generic formula given hereinabove. In each instance, the conditions utilized for the specified reaction are controlled so as to prepare fluoro alcohols which contain only one hydroxyl group per molecule which is available for subsequent reaction with the isocyanate groups. Among the applicable fluoro alcohols thereby prepared are included: hydroxyethyl-omega-pentadecafluoro alkyl undecanoate, i.e.

$$C_7F_{15}(CH_2)_{10}-\underset{\underset{O}{\|}}{C}-O-CH_2-CH_2OH$$

1,1 - di - omega-pentadecafluoro alkyl undecanoyloxy methyl-1-hydroxymethyl ethane, i.e.

$$[C_7F_{15}(CH_2)_{10}-\underset{\underset{O}{\|}}{C}-O-CH_2]_2-CH-CH_2OH$$

tri-omega-pentadecafluoro alkyl undecanoyl pentaerythtriol, i.e.

$$[C_7F_{15}(CH_2)_{10}-\underset{\underset{O}{\|}}{C}-O-CH_2]_3-C-CH_2OH$$

and, penta-omega-pentadecafluoro alkyl undecanoyl sorbitol.

Although the use of secondary alcohols, i.e. alcohols containing a —CHOH— group, is reflected neither in the generic formulae given hereinabove for the products of this invention nor in the above specified list of fluoro alcohols, it is to be noted that such alcohols are applicable for use in preparing the products of this invention and are deemed to be included within the scope thereof.

Among the isocyanate reagents applicable for use in the novel process of this invention are included: polyisocyanates such as 2,4-tolylene diisocyanate, 2,6-tolylene diisocyanate, mixtures of the latter tolylene diisocyanates, hexamethylene diisocyanate, ethylene diisocyanate, trimethylene diisocyanate, long chain dialkyl diisocyanates, methylene - bis - phenyl isocyanate, propylene-bis-phenyl isocyanate, polymethylene polyphenyl isocyanate, naphthalene diisocyanate, p-phenylene diisocyanate, xylylene diisocyanate, cyclohexylene diisocyanate, butylidene diisocyanate, and cyclopentylene diisocyanate. It is to be noted that the tolylene diisocyanates are the preferred isocyanate reagents for use in the process of this invention.

In addition, compounds whose molecules contain more than two isocyanate groups may also be utilized in the novel process of this invention in order to prepare fluoroaziridine compositions which exhibit water and oil repellent properties. Among the latter isocyanate compounds are included: p,p′,p″-triphenylmethane triisocyanate, diphenyl-4,6,4′-triisocyanate, and polymethylene polyphenyl isocyanates as well as the reaction products of polyhydric alcohols with an excess of a diisocyanate, e.g. the reaction product of trimethylol propane with an excess of tolylene diisocyanate.

The alkylenimines applicable for use in the process of this invention correspond to the formula:

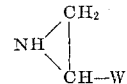

wherein W is a radical selected from the group consisting of hydrogen radicals and alkyl radicals containing from 1 to 2 carbon atoms. Specific alkylenimines include: ethylenimine, propylenimine and butylenimine.

In more detail, the procedure for the preparation of the fluoro compounds of this invention comprises slowly admixing the fluoro alcohol and the polyisocyanate compound in stoichiometric proportions under anhydrous conditions and, preferably, in an inert atmosphere such as under gaseous nitrogen. Thereafter, the resulting mixture is heated at a temperature of from about 25 to 200° C., and preferably from about 50 to 100° C., for a period of from about ½ to 12 hours. Needless to say, the length of the reaction will depend on the reaction temperature which is utilized as well as on the specific nature of the reactants, although the above noted reaction period of from ½ to 12 hours is usually sufficient to insure completion of the reaction as evidenced by the complete removal of the free hydroxyl group from the system. The reaction may, if desired, be conducted in the presence of a solvent and/or catalyst, although their presence is not essential to the process of this invention. Typical solvents include: aromatic hydrocarbons such as benzene and toluene; aliphatic hydrocarbons such as hexane and heptane; chlorinated hydrocarbons such as chloroform and carbon tetrachloride; tertiary amines such as triethylamine and N-methyl morpholine; and, ether; while typical catalysts include: tin compounds such as stannous octanoate and dibutyl tin dilaurate; antimony compounds such as antimony octanoate and antimony naphthenate; and lead compounds such as lead octanoate, etc.

In most instances, the resulting reaction products, which comprise the intermediates to be further reacted so as to lead to the preparation of my novel fluoro-aziridine compounds, are low melting, slightly brown solids which are soluble in such organic solvents as benzene and toluene. These intermediates should always contain at least one active isocyanate group which is available for subsequent reaction with the alkylenimine. It is to be noted that these intermediate isocyanate adducts exhibit some utility as water and oil repellency agents.

Thereafter, the selected alkylenimine is added to one of the above prepared intermediate products; the latter product being in the form of either the benzene solution in which it was originally prepared or in the form of a subsequently prepared organic solvent solution. The reaction temperature of the system is then raised to about 25 to 150° C., and preferably to about 50 to 80° C., and maintained at that level for a period of from about ½ to 12 hours, depending upon the reaction conditions being utilized. The completion of the reaction may be determined by following the disappearance of the isocyanate absorption band on an infra-red spectrum of the end product. Upon completion of the reaction, the solvent is removed from the system thereby yielding the fluoro-aziridine compound in the form of a low melting, colorless solid. The resulting products are generally soluble in acetone, alcohols, alcohol-benzene mixtures and chlorinated solvents. They can be stored for an unlimited period of time either by being maintained at temperatures below about 5° C. or by being kept at room temperature in the form of 20 to 30%, by weight, alcohol or acetone-dichloromethane solutions.

With respect to proportions, the determination of the precise concentration of the three primary ingredients in relation to one another, as based on the stoichiometric equivalencies of the two reactions, is left to the discretion of the practitioner, it being necessary in determining these proportions to insure that the intermediate product contains at least one isocyanate group which is available for reaction with the alkylenimine and that a sufficient concentration of alkylenimine is present in order to convert the latter isocyanate groups into N-carbamoyl aziridine groups. However, typical proportions for the preparation of the intermediates include the reaction of from about 0.5 to 0.9 mole of the fluoro alcohol with approximately one mole of the polyisocyanate, with the resulting intermediate thereafter being reacted with from about 0.5 to 1.1 moles of alkylenimine for each mole of polyisocyanate utilized in the preparation of the intermediate product.

The novel additives of this invention may be effectively utilized to treat a virtually unlimited variety of solid materials regardless of whether they exhibit fibrous, porous or continuous surfaces. Among such materials are included: textiles derived from wool, cotton, polyester, nylon, polyacrylonitrile and other synthetic fibers, glass, paper, wood, leather, fur, asbestos, brick, concrete, metal ceramics, plastics as well as painted and plastered surfaces. Thus, for purposes of convenience, when reference is hereinafter made to "applying to" or to "treating" or to the "treatment" of such substrates, the latter terms are meant to encompass both the coating and/or impregnation of porous substrates as well as the coating of impervious substrates.

The latter materials may be treated by means of any effective technique whose use is desired by the practitioner. Thus, textiles are typically treated by a "padding" technique wherein the textile is passed through an organic solvent solution of a novel fluorochemical product of this invention, squeezed through a nip and then briefly heated to evaporate the solvent. Typical organic solvents include isopropanol, acetone, methyl ethyl ketone, etc. The treated textile is subsequently cured by being heated at a temperature of from about 60 to 180° C. for a period of about 5 to 10 minutes, thereby developing total water and oil repellency. A Lewis acid catalyst, such as aluminum chloride, may be optionally present in order to enhance the latter curing operation. In addition, such surface coating techniques as spraying and brushing may also be effectively utilized in order to deposit a film of the repellent on the surface of the substrate. The amount of additive which is required to provide adequate water, oil and soil repellency will vary according to the particular fluorochemical product being used, the selected substrate and the specific end-use application of the resulting treated product, although the presence of as little as about 0.1% of the additive, based on the weight of the substrate, will ordinarily provide adequately improved water and oil repellency.

In addition, it is to be noted that the fluoro-aziridine compounds of this invention may be applied to the desired substrates while they are in the form of an aqueous emulsion, it being merely necessary to select an appropriate emulsifier for the system.

The actual application to substrates of the novel compositions of this invention may be accomplished by any means capable of effectively depositing a small concentration of the repellent. The figure illustrates a spray technique wherein, nozzle 10 sprays solution 11 of repellent onto substrate 12 which passes through drier 13 to remove solvent.

The following examples will further illustrate the embodiment of this invention. In these examples, all parts given are by weight unless otherwise noted.

EXAMPLE I

This example illustrates the preparation of a fluoro-aziridine compound typical of the novel products of this invention.

A reaction vessel fitted with a nitrogen inlet, a distillation apparatus combined with a drying tube and means for mechanical agitation was charged with 8.79 parts of benzene and 4.32 parts of an isocyanate mixture comprising 80%, by weight, of 2,4- and 20%, by weight, of 2,6-tolylene diisocyanate. The solution which was under a nitrogen atmosphere, was heated to 60° C. whereupon 13.4 parts of omega-perfluoroheptyl undecanol was added over a 10 minute period and the resulting mixture maintained at the latter temperature for a period of 3 hours. The resulting intermediate isocyanate adduct was retained in the benzene solvent.

The latter clear benzene solution was then cooled to 40° C. whereupon 1.08 parts of ethylenimine were added thereto. The reaction mixture was maintained at the latter temperature for a period of 20 minutes, with the initial crystallization of the product being observed after 10 minutes. Upon evaporating all traces of the benzene solvent, the fluoro-aziridine compound, i.e. 4-(omega-perfluoroheptyl undecanoxy carboxamido)-2-(aziridine carboxamido) toluene, was recovered in the form of a white crystalline solid which melted at 70–74° C. and which was readily soluble in either acetone or a 1:1 methanol:benzene solvent system.

EXAMPLE II

This example illustrates the preparation of another fluoro-aziridine compound typical of the novel products of this invention.

A reaction vessel fitted with a nitrogen inlet, a distillation apparatus combined with a drying tube, and means for mechanical agitation was provided with a nitrogen atmosphere and was charged with 9.8 parts of 2-perfluoroheptane carboxamido ethanol and 3.85 parts of an isocyanate mixture comprising 80%, by weight, of 2,4- and 20%, by weight, of 2,6-tolylene diisocyanate. The reaction mixture was heated to a temperature of 60° C. and maintained at that temperature for a period of 2 hours whereupon the intermediate product which was in the form of a slightly brown colored solid, was recovered.

The intermediate was cooled to 40° C. whereupon 0.83 part of ethylenimine and 10 parts of toluene were added thereto. The resulting mixture, which solidified after a 10 minute interval, was heated to a temperature of 70° C. for a period of one hour. Upon evaporating all traces of the toluene solvent, the fluoro-aziridine compound, i.e. 4-(2-perfluoroheptane carboxamido)-ethoxy carboxamido-2-(aziridine carboxamido) toluene, was recovered in the form of a slightly brown colored solid which melted at 114–117° C. and which was readily soluble in acetone, alcohol or benzene-alcohol solvent mixtures.

EXAMPLES III–VII

These examples illustrate the wide variety of reagents and reaction conditions which can be efficiently utilized in preparing the novel products of this invention.

A number of different fluoro-aziridine compounds were prepared, according to the general procedure set forth in Example I, hereinabove, utilizing a variety of reagents at different concentration levels and under varying reaction conditions. These variables are described in the following table wherein "Step 1" refers to the reaction between the fluoro alcohol and the polyisocyanate in order to form the intermediate isocyanate adduct and "Step 2" refers to the reaction between the isocyanate adduct and an alkylenimine in order to form the fluoro-aziridine end product.

| Example Number | III | IV | V | VI | VII |
|---|---|---|---|---|---|
| Step 1: | | | | | |
| (1) Omega-perfluoroheptyl undecanol, parts | 5.4 | | | | 10.0 |
| (2) Omega-perfluoropropyl undecanol, parts | | 4.9 | | | |
| (3) Dihydroperfluorooctanol, parts | | | 10.0 | | |
| (4) 2-hydroxymethyl, 5-perfluoroheptyl norbornene, parts | | | | 4.94 | |
| (5) An isocyanate mixture containing 80%, by weight, of 2,4- and 20%, by weight, of 2,6-tolylene diisocyanate, parts | 1.74 | 2.58 | 4.36 | 1.74 | |
| (6) Hexamethylene diisocyanate, parts | | | | | 3.1 |
| (7) Stannous octanoate, parts | | | | 0.086 | |
| (8) Lead octanoate, parts | | | | | 0.05 |
| (9) Benzene, parts | 8.79 | 8.79 | 8.79 | 4.39 | 4.5 |
| (a) Reaction temperature (° C.) | 60 | 60 | 60 | 60 | 60 |
| (b) Fluoro alcohol addition time (min.) | 10 | 10 | 45 | 40 | 40 |
| (c) Total reaction time (min.) | 180 | 180 | 210 | 180 | 70 |
| Step 2: | | | | | |
| (10) Ethylenimine, parts | | 0.65 | 1.08 | 0.72 | 0.8 |
| (11) Propylenimine, parts | 0.57 | | | | |
| (d) Reaction temperature (° C.) | 80 | 40 | 60 | 40 | 40 |
| (e) Alkylenimine addition time (min.) | 0 | 0 | 30 | 0 | 3 |
| (f) Total reaction time (min.) | 150 | 30 | 45 | 90 | 60 |
| (g) Melting point of fluoroaziridine end product (° C.) | 66–68 | 75–76 | 90–93 | 56–59 | 87–90 |

The data presented hereinabove clearly indicate the effectiveness of the novel process of this invention in the utilization of a wide range of reagents and reaction conditions.

EXAMPLE VIII

This example illustrates the excellent water and oil repellent properties exhibited by substrates which have been treated with the novel fluoro-aziridine compounds of this invention.

In order to demonstrate the excellent water and oil repellent characteristics of the novel derivatives of this invention, the following testing procedures were employed. In each instance, the cotton print cloth that was used as the textile sample was treated by means of a padding technique wherein the sample was passed through a 1:1 isopropanol:toluene solution of the selected derivative, squeezed through a nip, heated at a low temperature in order to evaporate the solvent and thereafter heated at a temperature of 150° C. for a period of 5 minutes in order to cure the thus treated fabric.

Oil repellency

The oil repellency of the treated cotton fabrics was measured by use of the "3M Oil Repellency Test"; the latter procedure being fully described on page 323 of the April 1962 issue of the Textile Research Journal. In this procedure, an 8" x 10" swatch of the treated cotton, which had been conditioned at a temperature of 70° F. and a relative humidity of 65% for a period of 4 hours, was securely fastened to a 5" hoop in order to provide a smooth wrinkle-free surface. Single drops of testing oils, which comprised varying mixtures of mineral oil and n-heptane were gently placed upon the fabric and after a three minute period, the fabric was visually studied in order to observe the extent of wetting and peneration. An oil repellency rating, as defined in the following table, was then assigned to each fabric. the latter rating corresponding to the composition of the particular oil mixture which contained the highest percentage of heptane and which did not penetrate or wet the fabric.

| Oil repellency rating | Volume percent of— | |
|---|---|---|
| | Mineral oil | Heptane |
| 120 | 30 | 70 |
| 110 | 40 | 60 |
| 100 | 50 | 50 |
| 90 | 60 | 40 |
| 80 | 70 | 30 |
| 70 | 80 | 20 |
| 50 | 100 | 0 |
| 0 | (¹) | (¹) |

[1] No resistance to mineral oil.

NOTE.—Ratings of 70 and above are indicative of effective oil repellency.

Water repellency

The water repellency of the treated cotton fabrics was measured by use of the "Standard Spray Test" of the American Association of Textile Chemists and Colorists—AATCC No. 22–1964. In this procedure, the cotton samples which were used were prepared according to the method described, hereinabove, in the "Oil Repellency Test." The swatch was then securely fastened to a 6" hoop so that it presented a smooth wrinkle-free surface. The test sample was positioned at a 45° angle with its mid-point directly opposite a spray nozzle so that the center of the spray pattern from the nozzle was, accordingly, aligned with the mid-point of the swatch. Thereupon 250 ml. of distilled water were sprayed onto the sample over a period of 25–30 seconds. The wet pattern which formed on the surface of the test sample was compared with a series of rated standard wet patterns. Each test sample was then assigned the rating of the standard pattern which most closely approximated the pattern on the test sample. The standard patterns were rated according to the following scheme:

100—No sticking or wetting of upper surface
90—Slight random sticking and wetting of upper surface
70—Partial wetting of whole of upper surface
50—Complete wetting of whole of upper surface
0—Complete wetting of whole of upper and lower surfaces The results of these determinations are presented in the following table:

| Repellent (example number) | Percent of repellent [1] | Oil rating | Spray rating |
|---|---|---|---|
| Control [2] | | 0 | 0 |
| I | 0.2 | 70 | 50 |
| I | 0.5 | 80 | 90 |
| I | 0.7 | 90 | 90 |
| I | 1.0 | 100 | 100 |
| I | 2.0 | 120 | 100 |
| II | 0.7 | 90 | 50 |
| III | 0.7 | 80 | 90 |
| IV | 0.7 | 70 | 50 |
| V | 0.7 | 100 | 70 |
| VI | 0.7 | 70 | 70 |
| VII | 0.7 | 90 | 100 |

[1] As based on weight of cotton fabric.
[2] Untreated cotton swatch.

The results summarized above clearly show the excellent oil and water repellency exhibited by the novel fluoroaziridine compounds of this invention.

Summarizing, it is thus seen that the process of this invention provides for the preparation of novel fluoroaziridine compounds which display excellent water, oil and soil repellency properties.

Variations may be made in proportions, procedures and materials without departing from the scope of this invention which is defined by the following claims.

What is claimed is:

1. A compound selected from the group consisting of:

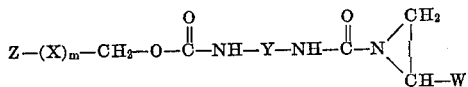

wherein

Z is a radical selected from the group consisting of straight chained and branched perfluoro alkyl radicals corresponding to the formula $C_sF_{(2s+1)}$ wherein $s$ is an integer having a value of from 3 to 7 inclusive;

X is a radical selected from the group consisting of alkylene radicals corresponding to the formula $(CH_2)_p$ wherein $p$ is an integer having a value of from 1 to 10 inclusive, 5-yl-norbornene-2-yl-methyl radicals,

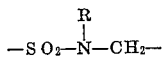

radicals wherein R is a radical selected from the group consisting of hydrogen radicals and alkyl radicals containing from 1 to 6 carbon atoms,

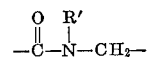

radicals wherein R' is a radical selected from the group consisting of hydrogen radicals and alkyl radicals containing from 1 to 6 carbon atoms;

$m$ is an integer having a value of from 0 to 1 inclusive;

Y is a radical selected from the group consisting of alkylene radicals corresponding to the formula $(CH_2)_e$ wherein $e$ is an integer having a value of from 4 to 36 inclusive, tolylene, naphthylene, methylene-bis-(phenyl), propylene-bis-(phenyl), phenylene, diphenylene, xylylene, cyclopentylene, and cyclohexylene radicals; and, W is a radical selected from the group consisting of hydrogen radicals and alkyl radicals containing from 1 to 2 carbon atoms.

References Cited

UNITED STATES PATENTS 3,066,997  12/1962  Neher et al. _____ 260—471

OTHER REFERENCES

Elderfield et al.: J. Org. Chem., vol. 26, pages 1917–1923 (1961).

Smith, Open-Chain Nitrogen Compounds, vol. 2, pages 239–240 (New York, 1966).

ALTON D. ROLLINS, Primary Examiner

U.S. Cl. X.R.

117—105.3, 121, 124 D, 126 AQ, 135.5; 260—471 R, 482 C